United States Patent [19]

Brown

[11] Patent Number: 4,493,198
[45] Date of Patent: Jan. 15, 1985

[54] ANTI-THEFT LOCK FOR PEDAL OPERATED APPARATUS

[76] Inventor: William B. Brown, 18700 Covello St., Reseda, Calif. 91335

[21] Appl. No.: 414,895

[22] Filed: Sep. 3, 1982

[51] Int. Cl.³ ............................................. F16H 57/00
[52] U.S. Cl. ..................................................... 70/203
[58] Field of Search ................ 70/203, 201, 202, 200, 70/199, 198, 237

[56] References Cited

U.S. PATENT DOCUMENTS

| | | | |
|---|---|---|---|
| 1,025,180 | 5/1912 | Wreford | 70/203 |
| 1,097,081 | 5/1914 | Coon | 70/203 |
| 1,193,202 | 8/1916 | Swanson | 70/203 |

FOREIGN PATENT DOCUMENTS

| | | | |
|---|---|---|---|
| 2443946 | 8/1980 | France | 70/203 |

Primary Examiner—Robert L. Wolfe
Attorney, Agent, or Firm—Allan M. Shapiro

[57] ABSTRACT

First and second stop bodies are arranged to clamp around the lever of a pedal which operates an apparatus. When the stop bodies are locked in place, the pedal cannot be operated and, thus, the apparatus is restrained.

5 Claims, 3 Drawing Figures

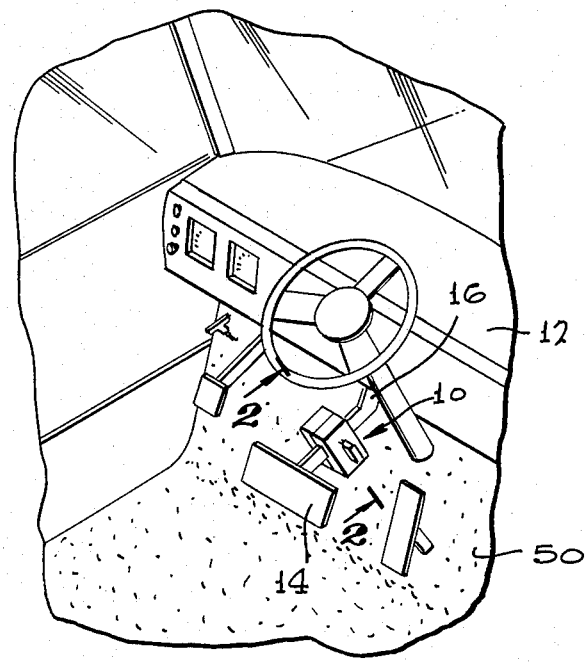
FIG. 1
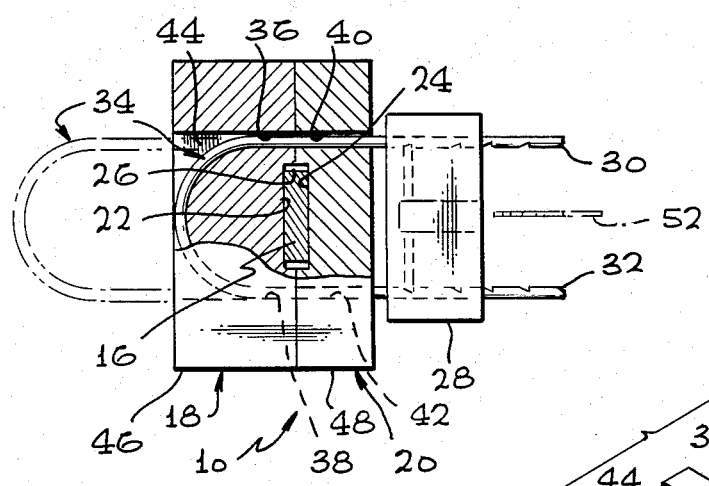
FIG. 2
FIG. 3

ANTI-THEFT LOCK FOR PEDAL OPERATED APPARATUS

BACKGROUND OF THE INVENTION

This invention is directed to a locking mechanism particularly useful for pedal-operated vehicles and other apparatus to prevent unauthorized operation of the apparatus and potential theft thereof.

Quite a number of different kinds of apparatus, and particularly vehicles, are operated with pedals. While such vehicles and apparatus may be locked in other ways, oftentimes the lock may be circumvented and the apparatus utilized by an unauthorized person. For example, automobiles have an ignition lock and modern automobiles also lock the steering mechanism. However, it is possible to circumvent such locks with the consequence of considerable theft and other unauthorized usage of such vehicles. Small aircraft are pedal-operated, and small aircraft have not been as carefully protected against unauthorized use as have automobiles in the recent past. Therefore, an anti-theft lock for such small aircraft and other pedal-operated apparatus is required.

SUMMARY OF THE INVENTION

In order to aid in the understanding of this invention, it can be stated in essentially summary form that it is directed to an anti-theft lock for pedal-operated apparatus and is comprised of first and second stop bodies which cooperate together to engage therebetween the lever of a pedal. A lock interengages the stop bodies so that they cannot be removed without releasing the lock. The stop bodies are configured so as to prevent the effective operation of the pedal to thus prevent operation of the apparatus for which pedal actuation is required.

It is an object of this invention to provide an anti-theft lock for pedal-operated apparatus wherein the lock can be quickly and easily attached to the lever under a pedal with the lock engaging on adjacent structure to prevent effective operation of the pedal.

It is a further object of this invention to provide an inexpensive, secure, and quickly attachable and detachable lock which engages on the lever under a pedal so that the pedal lever is clamped and the actuation of the pedal is inhibited.

It is a further object to provide an anti-theft lock which is inexpensive of construction, easily attached, and provides secure inhibition of the pedal-operated apparatus on which it is locked.

The features of the present invention which are believed to be novel are set forth with particularlity in the appended claims. The present invention, both as to its organization and manner of operation, together with further objects and advantages thereof, may be best understood by reference to the following description, taken in conjunction with the accompanying drawings.

BRIEF DESCRIPTION OF THE DRAWINGS

FIG. 1 is an isometric view of the driver's controls in an automobile or similar pedal-operated apparatus, with the anti-theft lock of this invention secured to the pedal thereof.

FIG. 2 is an elevational view of the anti-theft lock of this invention, with parts broken away and parts taken in section, as generally seen along the line 2—2 of FIG. 1.

FIG. 3 is an exploded drawing of the anti-theft lock of this invention.

DESCRIPTION OF THE PREFERRED EMBODIMENT

The anti-theft lock of this invention is generally indicated at 10 in FIGS. 1, 2 and 3. A vehicle 12 is indicated in FIG. 1. The vehicle 12 is generally indicated as an automotive land vehicle, such as a passenger car or a light truck. It has the usual controls and, for the purposes of this invention, the most important control is the brake pedal 14 mounted on brake lever 16. As is well-known in the art, when brake pedal 14 is depressed, lever 16 swings on a pivot, and the vehicle brakes are actuated. Without being able to utilize the brakes, it is difficult to move vehicle 12, thus theft is inhibited. As is described hereinafter, lock 10 embraces brake lever 16 to inhibit actuation of the brakes to, thus, inhibit vehicle theft.

There are many other types of apparatus which are operated by pedals, and it is on occasion necessary to inhibit operation of these other types of apparatus. These other types of apparatus include such devices as small aircraft, tractors, earth-moving machinery and the like. Thus, for the purpose of this invention, the vehicle 12 represents any type of pedal-operated apparatus for which it is desirable to inhibit operation.

Lock 10 comprises first and second stop bodies 18 and 20. At least one of the stop bodies has a recess therein to receive brake lever 16. As shown herein, recesses 22 and 24 cooperate together to form an opening 26 which receives brake lever 16.

The stop bodies 18 and 20 are locked together by means of lock body 28 which engages the legs 30 and 32 of U-shaped shackle 34. Openings 36 and 38 in stop body 18 respectively align with openings 40 and 42 in stop body 20. Furthermore, these openings have the same distance therebetween as the legs 30 and 32 of shackle 34 so that the legs pass therethrough, as shown in FIG. 2. In addition, slot 44 joins the openings 36 and 38 in stop body 18. Slot 44 has a circular bottom to receive the curve of the U-shaped shackle so that, when fully inserted, the shackle 34 has its curved end adjoining the legs completely recessed within stop body 18. In this way, the shackle 34 is protected against approach.

The stop bodies 18 and 20 are embraced around brake lever 16, or any other operating lever, for the apparatus to be protected. Shackle 34 is inserted and lock body 28 is pressed in place against the right surface of stop body 20. In this position, the shackle is fully protected against cutting, and the stop bodies 18 and 20 cannot be removed from the lever 16. In order to be effective in preventing actuation of the lever, at least one of the stop bodies must engage against another part of the apparatus when actuation of the pedal is attempted. In this case, the lower faces 46 and 48 engage against the floor 50 of the apparatus 12 before the brake pedal 14 can be effectively actuated. The lower faces 46 and 48 need not extend the same distance, but one of the faces must extend sufficiently close to another abutment on the apparatus, such as floor 50, to inhibit operation of the lever 16.

When an authorized user wants to operate the apparatus 12, he can remove the lock 10. This is done by employing key 52 to release lock body 28 from shackle 34. Thereupn, the two stop bodies 18 and 20 can be removed and stored for later use. In other kinds of apparatus, the lever 16 may be a rudder pedal on an airplane, a clutch on a tractor, or a clutch or brake lever on a hoist device. Thus, the anti-theft lock 10 of this invention is of broad utility for the securement of pedal-operated apparatus against unauthorized use.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An anti-theft lock for pedal-operated apparatus having a pedal lever, said lock comprising:
   first and second adjacent stop bodies, one of said stop bodies having a recess for receiving the pedal lever and the other of said stop bodies having a face thereon for abutment against an adjacent portion of the apparatus to limit actuation of the pedal lever to inhibit operation of the apparatus; and
   locking means including a lock body having a shackle embracing the pedal lever and engaging both said first and second stop bodies to hold together said stop bodies to hold the pedal lever therebetween.

2. The anti-theft lock of claim 1 wherein said locking means is a shackle lock wherein said shackle has first and second substantially parallel shackle legs and said stop bodies have openings therethrough to receive said shackle legs, said locking means including a lock body which receives both of said shackle legs and engages against one of said stop bodies when in the locked position.

3. The anti-theft lock of claim 2 wherein one of said stop bodies has a slot therein to receive that portion of said shackle which interengages said shackle legs and said lock body engages against the other of said stop bodies.

4. The anti-theft lock of claim 1 wherein said stop bodies have adjoining faces when in the locked position, and said recess to receive the pedal lever is formed in both of said surfaces, said recess being substantially midway across said surfaces.

5. The anti-theft lock of claim 4 wherein one of said stop bodies has a slot therein to receive that portion of the shackle which interconnects said legs of said shackle, and said one stop body is thicker in a direction normal to said adjoining faces that the other said stop body.

* * * * *